United States Patent [19]

Baba et al.

[11] 4,249,211
[45] Feb. 3, 1981

[54] COMPOSITE IMAGE DISPLAY APPARATUS

[75] Inventors: Takaaki Baba, Nishinomiya; Teruo Kitani, Takatsuki; Masao Nakazawa, Nagaokakyo; Hirokazu Yoshino, Katano; Tatsuo Fujita, Moriguchi; Eiichi Tsuboka, Neyagawa, all of Japan

[73] Assignee: Matsushita Electric Industrial Co., Ltd., Kadoma, Japan

[21] Appl. No.: 9,731

[22] Filed: Feb. 5, 1979

[30] Foreign Application Priority Data

Feb. 7, 1978 [JP] Japan .................. 53-13232

[51] Int. Cl.³ .......................... H04N 5/22
[52] U.S. Cl. ........................ 358/183; 358/180
[58] Field of Search ........... 358/180, 183, 230, 237, 358/242

[56] References Cited

U.S. PATENT DOCUMENTS 3,437,873  4/1969  Eggert .................. 358/183 X
3,943,280  3/1976  Kimura et al. .......... 358/180 X

FOREIGN PATENT DOCUMENTS 2811852  9/1978  Fed. Rep. of Germany .......... 358/180

*Primary Examiner*—Robert L. Richardson
*Attorney, Agent, or Firm*—Wenderoth, Lind & Ponack

[57] ABSTRACT

An image display apparatus has an: image signal receiver for simultaneously receiving two different image signals, a first image signal and a second image signal; a memory for writing therein the second image signal; controlling means for controlling the writing position, writing frequency, writing sequence, reading-out sequence, reading-out frequency and start-timing of reading-out of the second image signal; a display for displaying full picture information or partial picture information of the second image signal a part of a displayed picture of the first image signal by selectively reading-out the second image signal under the control of the controller; and zoom-up device for stepwisely or continuously varying the writing position and reading-out position of the second image signal controlled by the controller so as to zoomwisely display the full or partial picture of the second image signal on the picture of the first image signal.

5 Claims, 39 Drawing Figures

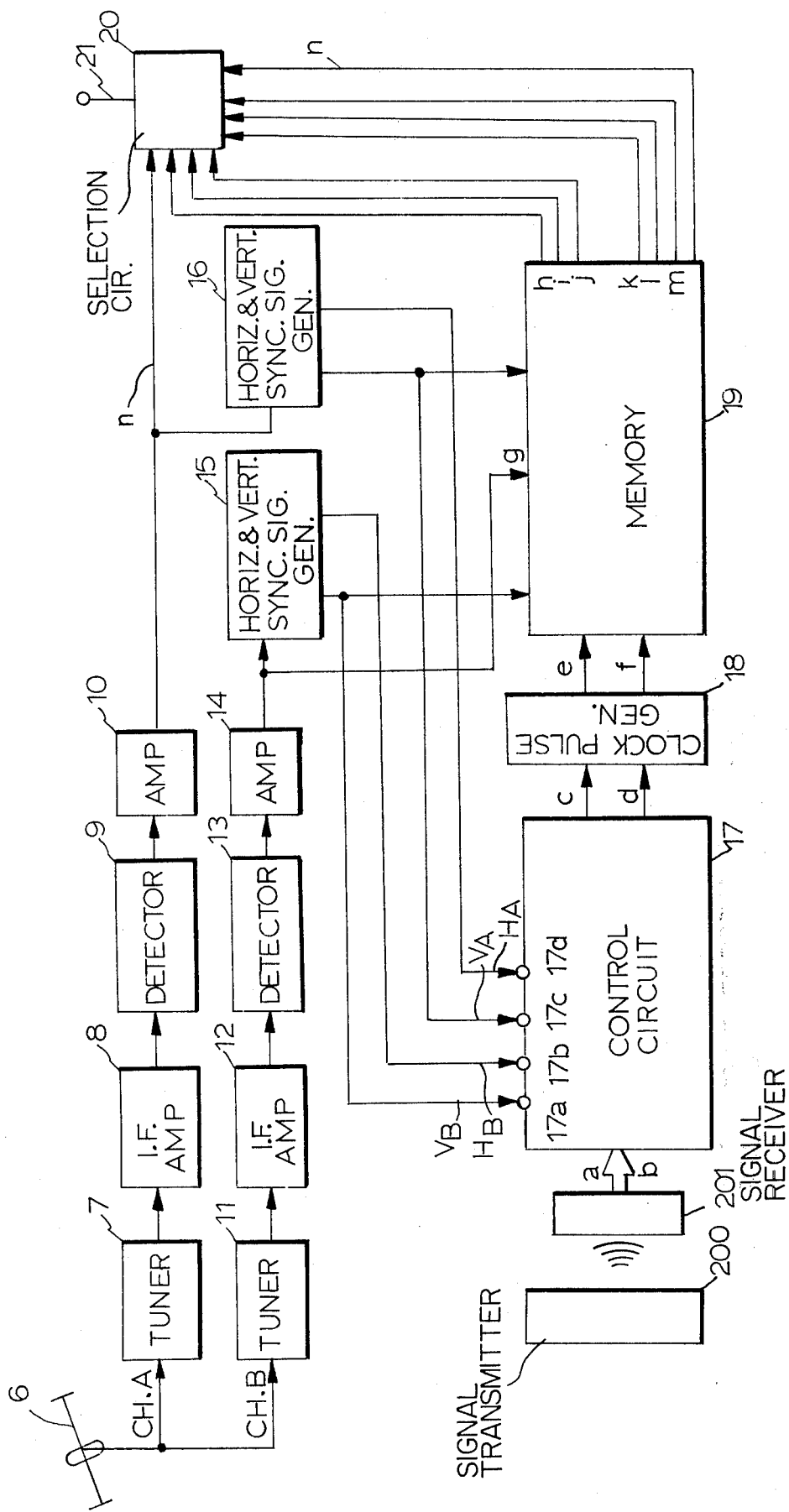

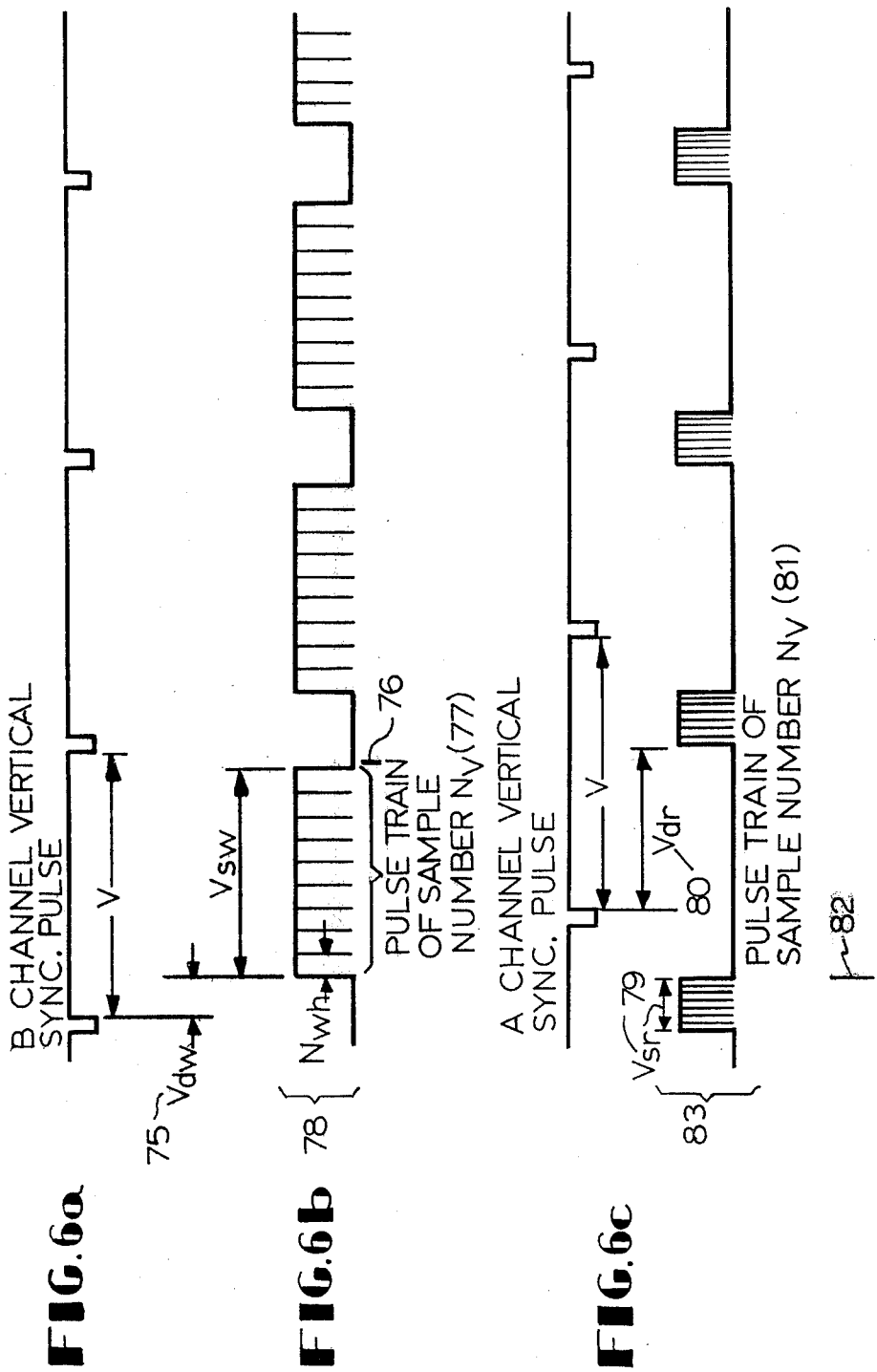

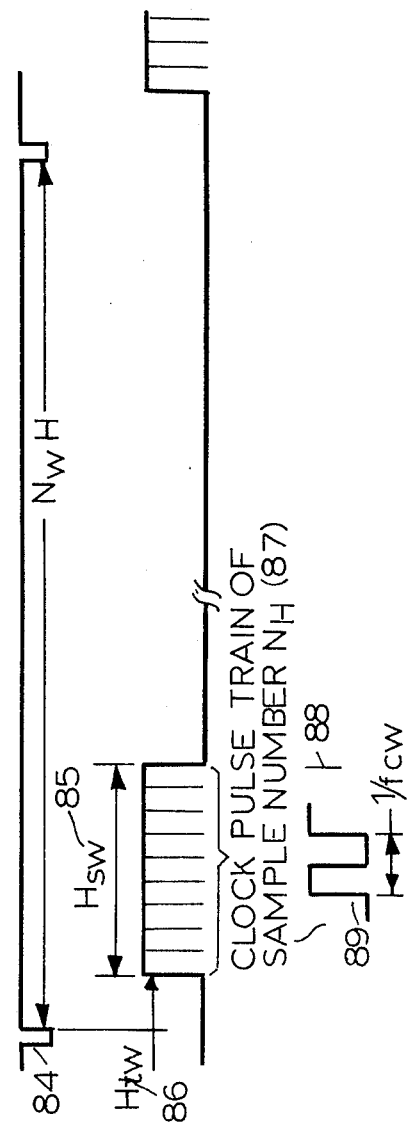
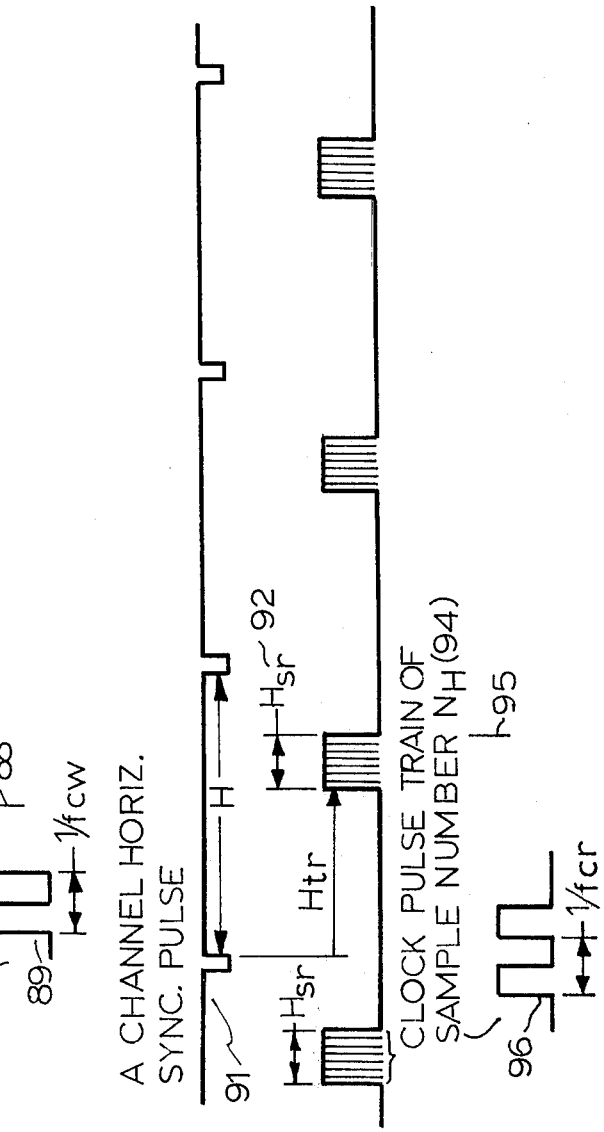

A CHANNEL

B CHANNEL
FIG.9c $B_1$ 
FIG.9d $B_2$ 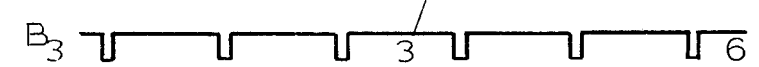
FIG.9e $B_3$ 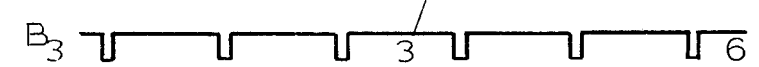
FIG.9f (104) 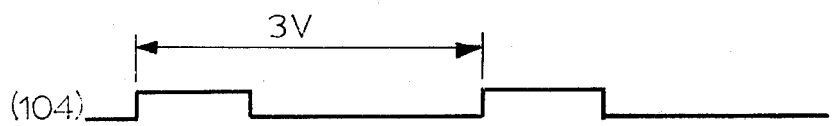
FIG.9g (105) 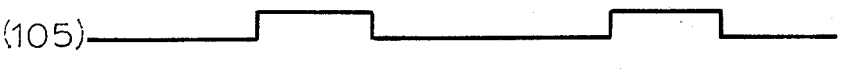
FIG.9h (106) 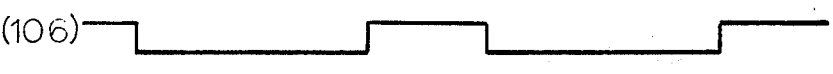
FIG.9i (107) 
FIG.9j (108) 
FIG.9k (109) 

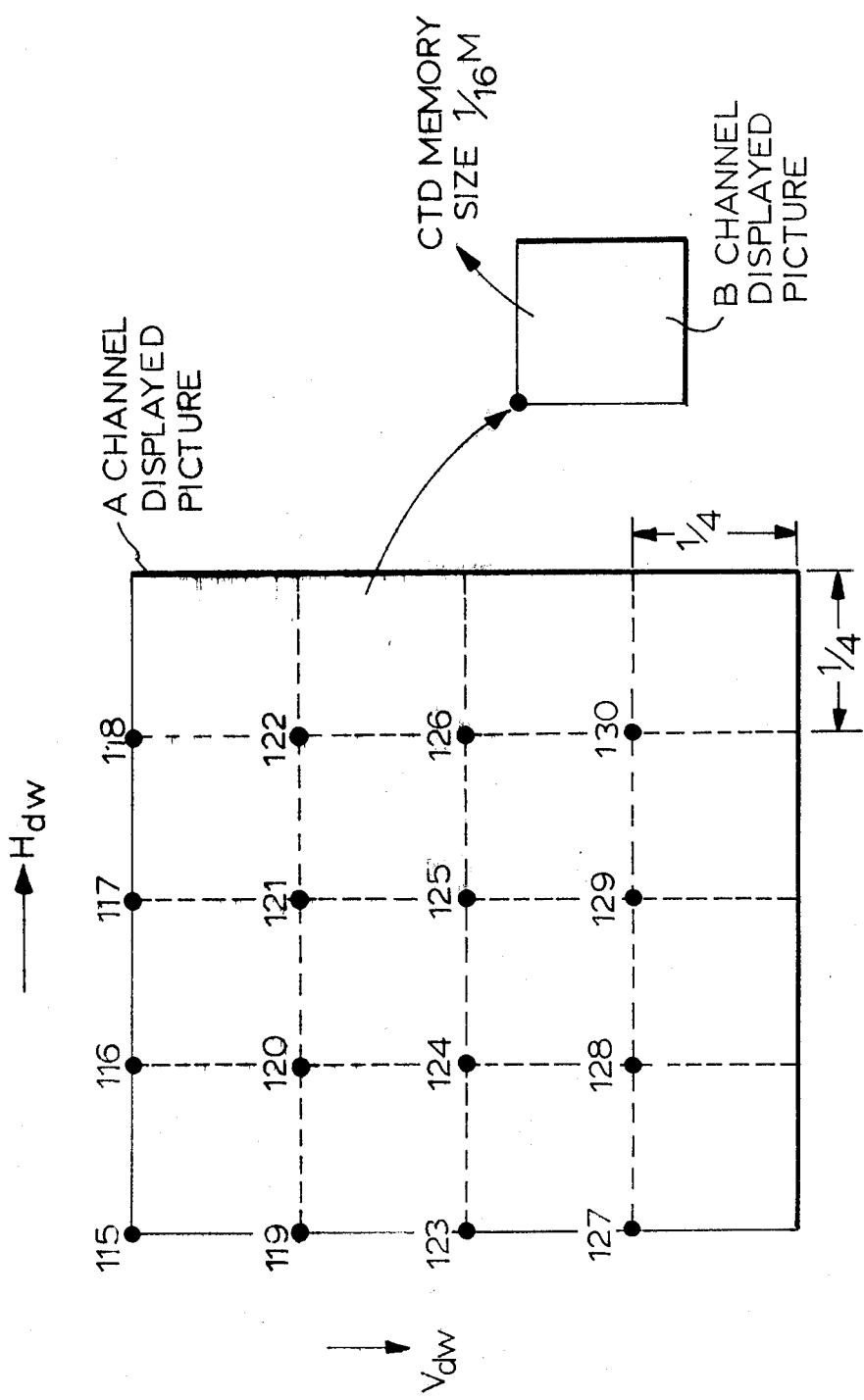

COMPOSITE IMAGE DISPLAY APPARATUS

This invention relates to an image display apparatus, such as a television receiver, for simultaneously displaying two different image signals, such as television signals of two channels, on a display screen such as a CRT.

A known image display apparatus merely displays a picture produced from a second image signal (a television signal of one channel) on a portion of a picture of a first image signal (a television signal of another channel) as disclosed e.g. in the Japanese Published Unexamined Patent Application No. 49-2419/1974. However, according to such known apparatus, the size of the picture produced from the second image signal is fixed.

It is an object of this invention to provide an image display apparatus, in which the picture produced from the image signal and to be displayed on the other picture can be zoomed.

This object is achieved according to this invention by an image display apparatus comprising: image signal receiving means for simultaneously receiving a first image signal and a second image signal which are different from each other; memory means coupled to said image signal receiving means for writing therein full picture information or partial information corresponding to the said second image signal; control means coupled to said memory means for controlling the writing position of said second image signal in said memory means, the writing frequency of said second image signal in said memory means, the writing sequence of said second image signal in said memory means, the reading-out sequence of said second image signal from said memory means, the reading-out frequency of said second image signal from said memory means, and the timing of starting reading-out of said second image signal from said memory means; display means coupled to said control means for displaying full picture information or partial picture information said second image signal on a part of the displayed picture produced from said first image signal by selectively reading-out said second image signal from said memory means under the control of said control means; and display position control means, hereinafter referred to as zoom-up means, for stepwisely or continuously varying said writing position of said second image signal in said memory means and also varying the position of written second image signal in said memory means to be read out.

According to a further development of this invention, the zoom-up means is constructed in such a manner that information on the writing positions of said second image signal corresponding to positions of pictures to be displayed are preset by digitally coding said information on the writing positions, and one of the preset writing positions is selected by remote control operation. According to a still further development of this invention, the zoom-up means comprises TTL (transistor-to-transistor logic) monolithic logics which are constructed in a manner such that said writing position and said read-out position of said second image signals in said memory means can be selected by varying the CR (capacitance-resistance) time constants of said monolithic logics. According to yet a further development of this invention, the zoom-up means comprises a programmable counter driven by a remote control signal, which is a digital signal, obtained by a remote control signal generator and a remote control signal receiver, and constructed in a manner such that the frequency division ratio, for dividing horizontal synchronous signals to determine number of horizontal line periods in which said second image signal is to be written, is controlled by said programmable counter which is actuated by said remote control signal to give a predetermined frequency division ratio. According to another development of this invention, the memory means comprises plural charge transfer devices arranged in a two dimensional matrix, said charge transfer devices having a function to delay analog signals and a signal storing function.

This and other objects and features of this invention will be apparent upon considering the following detailed description, taken in conjunction with the accompanying drawings, in which:

FIGS. 1(a) to 1(d) are schematic drawings showing displayed pictures;

FIG. 2 is a schematic block diagram of a main portion of an example of the apparatus according to this invention;

Figure 4A:
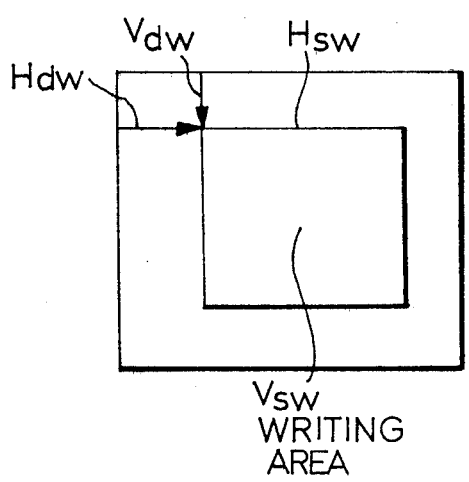
Figure 4B:
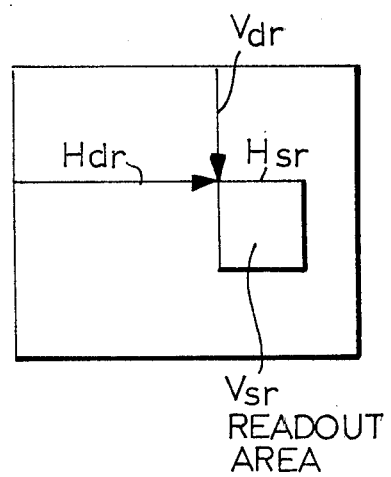
Figure 5:
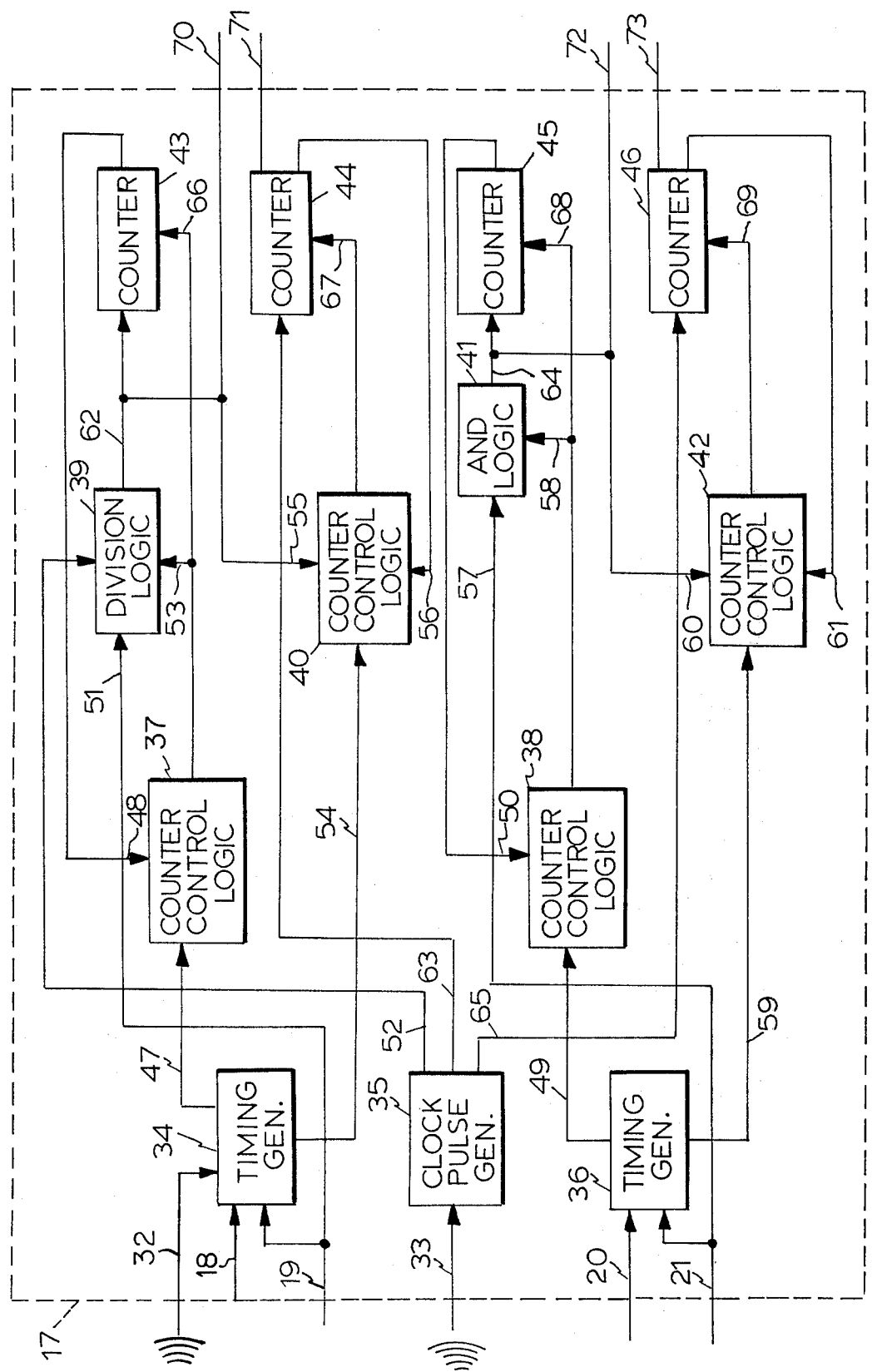

FIGS. 4(a) and 4(b) are schematic drawings showing displayed pictures for explaining the basic concept of this invention;

FIG. 5 is a schematic block diagram of an example of a control circuit (control means) to be used in the example of this invention;

FIGS. 6(a) to 6(d) and 7(a) to 7(g) are time charts of signals at various points in the circuit of FIG. 5;

FIGS. 8(a) to 8(d) are time charts to schematically show how the writing timings and the writing areas of the second image signals vary in the example of this invention;

FIGS. 9(a) to 9(k) are time charts to show relations between writing of the second image signals in the memory circuit and the reading-out of the second image signals from the memory circuit in the example of this invention; and FIG. 10 is a schematic drawing to show examples of the selection of writing positions applicable to this invention.

FIG. 1 shows an example of displaying two independent pictures 1 and 2 for different channels A and B on the same screen: picture 1 from the channel A, and picture 2 from the channel B. In the case when the picture 1 for A channel and the picture 2 for B channel are as shown in FIGS. 1(a) and 1(b), respectively, a mixed picture 3 can be obtained by compressing the display lengths of the picture 2 to half of the original ones in both the vertical and horizontal directions. A method for displaying such a picture 3 is known from the Japanese Published Unexamined Patent Application No. 49-2419/1974. According to the basic concept of the known method, one horizontal line of every two horizontal lines in the B channel is fixedly selected (namely the period for selecting the horizontal line signals is 2H), and the picture elements of the selected H line signals are sampled and stored in memories (that is a writing operation is performed); and the contents of the memories are read out in every horizontal synchronous interval H at a reading-out rate twice as high as the sampling rate for the writing operation when the horizontal scanning for the A channel sweeps the area B shown in FIG. 1(c).

Figure 1A:
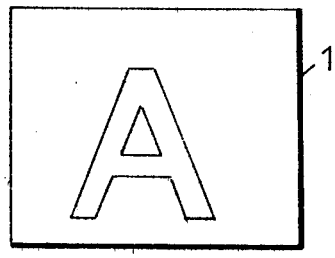
Figure 1B:
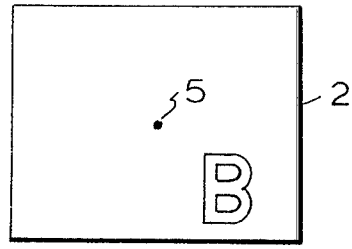
Figure 1C:
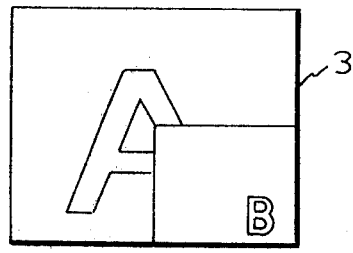
Figure 1D:
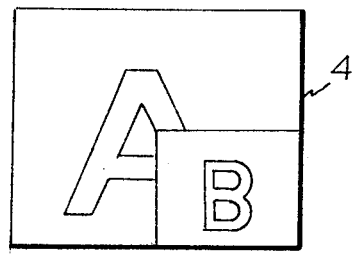

The aim of this invention is to provide a mixed picture 4 as shown in FIG. 1(d) which includes a partially zoomed picture for information in an area B as shown in FIG. 1(c). Such partial zooming is very useful for an observer to observe detailed information in the reduced size area B without decreasing the display area for the channel A. To attain the picture area B shown in FIG. 1(d), for example, the period of selecting the horizontal line signals is changed from 2H to H and the rate of sampling (and storing) is doubled and the reading-out rate is the same as compared with the conditions described above to achieve the picture 3 shown in FIG. 1(c). Thus, according to this invention, a partially zoomed display of B (the subchannel image) can be attained by controlling the write-start timing, i.e. the selection of the horizontal line signals, and sampling rate in a selected horizontal line. That is, based on the principle described above, this invention makes possible a zoomed display of the B (sub) channel image (picture) by controlling write-start timing, selection of the horizontal line-signals and the sampling rate in a selected horizontal line for the B channel signals.

FIG. 2 shows an example of the specific configuration of this invention, in which reference numeral 6 designates an antenna, 7 and 11 are tuners for receiving broadcast signals of different channels A and B, 8 and 12 are video intermediate frequency amplifiers, 9 and 13 are video detectors, 10 and 14 are amplifiers, 15 is a circuit for producing a vertical synchronizing signal $V_B$ and a horizontal synchronizing signal $H_B$ for the channel B, and 16 is a circuit for producing a vertical synchronizing signal $V_A$ and horizontal synchronizing signal $H_A$ for the channel A. Reference numeral 17 is a control circuit, receiving the synchronizing signals $V_A$, $H_A$, $V_B$, $H_B$ at terminals 17a, 17b, 17c and 17d, respectively, a control signal a and a position control signal b from a remote control signal receiver 201 which in turn is controlled by a remote control signal transmitter 200, as an input, and producing writing timing signal c and reading-out timing signal d, which include the information for selection of the horizontal line signals and variable sampling rate in a selected horizontal line. Reference numeral 18 is a circuit for producing clock pulses e and f with a high pulse amplitude (about 10 V). These pulses e and f are required when CTD (charge transfer devices) are used to construct the memory 19.

The video signals for the B channel produced at the output of the amplifier 14 are applied to the memory 19 as input signal g and are stored therein until the start of read-out of the signals. Those stored video signals appear for each field as the signals h, i and j at an output. These signals are applied to selection circuit 20. The video signal n for the A channel produced at the output of the amplifier 10, is applied to the selection circuit 20. At terminal 21, the selection circuit 20 produces an output signal, which corresponds to the mixed images shown in FIG. 1(c) or 1(d), by mixing the signals h, i and j and signal n. Signals k, l, m applied to the selection circuit 20 are used to control such a mixing.

Figure 3:
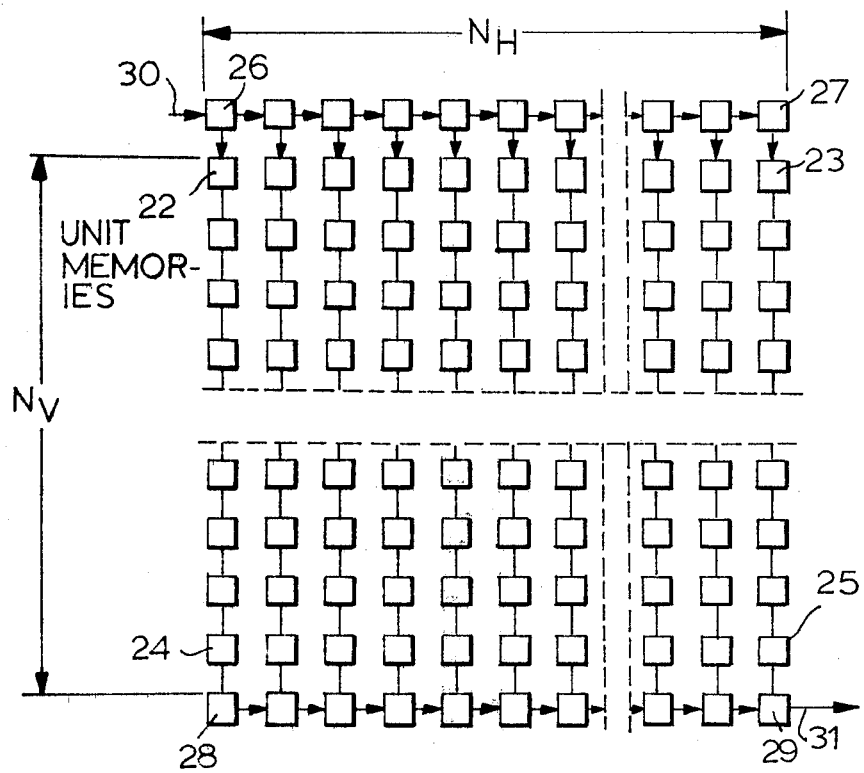
FIG. 3 is a schematic block diagram of an example of a memory circuit (memory means) to be used in the example of this invention.

Next, details of the memory 19, control system 17, clock pulse generator 18 and selection circuits 20 will be described. FIG. 3 shows an example of memory 19 constructed by using CTD. Unit memory cells, each of which is to store a unit image (picture) information are arranged in a two-dimensional matrix. More specifically, in this memory 19, $N_H \times N_V$ unit memories 22 are arranged in a rectangular matrix as schematically shown. The number $N_H$ is chosen to be equal to the number of sampling points of the video signals for the B channel in selected horizontal (H) lines, and the number $N_V$ is chosen to be equal to the total number of horizontal (H) lines, which determines the longitudinal size of the displayed image for the B channel, inserted in a portion of the A channel picture, as shown in FIG. 1. Memory cells designated by reference numerals 26 and 27 constitute the memory used for the writing operation of the video signals. Memory cells designated by reference numerals 28 and 29 constitute a memory used for the reading-out operation of the video signals which are stored in the two dimensional matrix array ($N_H \times N_V$) designated by reference numerals 22 to 25, after the completion of the writing operation.

The video signals for the B channel which exist at a selected horizontal (H) line interval are applied to input terminal 30, and sampled $N_H$ times with a clock frequency of $f_{CW}$. In this way, image information for $N_H$ points corresponding to video signal information for the B channel in the selected line are produced and shifted into the memories 26, 27 in order. Then the shifted image information for each of the $N_H$ points are simultaneously shifted into the memory cells 22, 23, before video signals for the next selective horizontal line of the B channel picture are applied to the input terminal 30. Therefore, the memory cells 26, 27 become empty and become able to accept the next input. The series of writing operations as described above is repeated $N_V$ times for a period of $n_W H$ (where $n_W$ is an integer, H is the horizontal interval of the TV signal), and thereby total image information for a vertical field, which constitutes the inserted picture B shown in FIG. 1, is completely stored in the matrix array ($N_H \times N_V$). The reading-out of the stored image information is conducted in an order the reverse of that of the writing operation described above by using the memory cells 28, 29 instead of the memory cells 26, 27. The reading-out operation is different from the writing operation in that the memory cells 28, 29 are operated at the clock frequency of $f_{CR}$ and the operation is repeated for the period H.

FIGS. 4a and 4b show the relation between the writing area in the B channel field and the reading-out area of the B channel field into the A channel field, including the starting times of writing and reading-out operations. These figures are provided for explaining the details of the operation of the control circuit 17. As explained in connection with the operation of the memory 19 shown in FIG. 3, $f_{CW}$, $f_{CR}$ are the frequencies of the writing and reading-out operations, respectively. Integer $n_W$ is a display ratio of the writing pattern (that is character symbol B in FIG. 1(b)) to the read-out pattern (that is character symbol B in FIG. 1(c) or 1(d)). Symbols $H_{SW}$ and $V_{SW}$ are writing intervals in the transverse direction and longitudinal direction, respectively, in the writing area. Symbols $H_{dW}$, $V_{dW}$ are intervals up to the starting point of the writing area in the transverse direction and longitudinal direction, respectively.

For example, the point 5 in FIG. 1(b), corresponds to this starting point. Symbols $H_{SR}$, $V_{SR}$ are reading-out intervals in the transverse direction and longitudinal direction, respectively, in the reading-out area. Symbols $H_{dR}$, $V_{dR}$ are intervals up to the starting point of the reading-out area in the transverse and longitudinal directions, respectively. According to such definitions, the symbols $f_{CW}$, $f_{CR}$, $n_W$, $H_{SW}$, $V_{SW}$, $H_{SR}$, $V_{SR}$, $N_V$ and $N_H$ are related to each other as follows.

$$V_{SW} = N_V \cdot n_W H \tag{1}$$

$$H_{SW} = N_H / f_{CW} \tag{2}$$

$$V_{SR} = N_V \cdot H \tag{3}$$

$$H_{SR} = N_H / f_{CR} \tag{4}$$

In addition, the following equation (5) should be satisfied so that relative longitudinal vs. transversal ratios of the writing area to the reading-out area will not change.

$$H_{SW}/V_{SW} = H_{SR}/V_{SR} \tag{5}$$

Substituting the equations (1) to (4) in the equation (5), the following equation is obtained.

$$f_{CR} = n_W \cdot f_{CW} \tag{6}$$

Thus, from the equation (6), it is seen that the variable parameters $n_W$ and $f_{CW}$ can be used to change the display ratio of a writing pattern (that is character B in FIG. 1(b)) to a reading-out pattern (that is character B in FIG. 1(c) or 1(d)) without the size of the memory 19 characterized by $N_V \cdot N_H$ and the reading-out area of the B channel field characterized by $V_{SR} \cdot H_{SR}$.

FIG. 5 shows details of the control circuit 17 having the function of variable display ratio $n_W$ and the writing clock frequency $f_{CW}$, defined in the equation (6). A block designated by reference numeral 34 is a timing generator for producing a vertical timing signal designated by reference numeral 75 in FIG. 6a with the interval $v_{dW}$ at a terminal designated by reference numeral 47 and a horizontal timing pulse designated by reference numeral 86 in FIG. 7c with the interval $H_{dW}$ at a terminal disignated by reference numeral 54, and the vertical synchronous pulse for the B (sub) channel is applied to a terminal designated by reference numeral 18, the horizontal synchronous pulse for the B (sub) channel is applied to a terminal designated by reference numeral 19 and the information for the intervals $V_{dW}$ and $H_{dW}$, which are supplied by means of a remote-control oscillator or an external switch apparatus are applied to a terminal designated by reference numeral 32.

A block designated by reference numeral 36 is a timing generator for producing vertical timing pulse designated by reference numeral 80 in FIG. 6c with the interval $V_{dR}$ at a terminal designated by reference numeral 49 and horizontal timing pulse designated by reference numeral 93 in FIG. 7f with the interval $H_{dR}$ at a terminal designated by reference numeral 59, and the vertical synchronous pulse for the A (main) channel is applied to a terminal designated by reference numeral 20 and the horizontal synchronous pulse for the A (main) channel is applied to a terminal designated by reference numeral 21.

A clock pulse generator designated by reference numeral 35 produces a pulsed signal having a reading-out frequency of $f_{CR}$ and also produces a pulsed signal having a writing frequency of $f_{CW}$, in accordance with the equation (6), the information for the display ratio $n_W$ being supplied by means of a remote-control oscillator or an external switch apparatus and applied to a terminal designated by reference numeral 33. The clock frequencies $f_{CR}$ and $f_{CW}$ are produced respectively at a terminal designated by reference numeral 65 and a terminal designated by reference numeral 63, respectively. Output information having a display signals at an interval $n_{wH}$ shown in the pulse train signals as characterized by an interval $n_WH$ shown in pulse train, designated by reference numeral 78 in FIG. 6b, is also produced at a terminal designated by reference numeral 52.

Blocks designated by reference numerals 43, 44, 45, 46 are counters. The numbers of bits in the counters 43 and 45 are chosen to be equal to the memory size $N_V$, and the numbers of bits in the counters 44 and 46 are chosen to be equal to the memory size $N_H$. A counter control logic designated by reference numeral 37 produces a train of timing pulses designated by reference numeral 77 in FIG. 6b at a terminal, designated by reference numeral 62, of programmable $N_W$ division-logic designated by reference numeral 39, when the timing interval $V_{dW}$ is applied to the terminal 47, a counted output designated by reference numeral 76 in FIG. 6b is supplied from the counter 43 is applied to a terminal designated by reference numeral 48, a horizontal synchronous pulse for the B (sub) channel is applied to a terminal designated by reference numeral 51, and an output of the control logic 37 self-consistently resets the $n_W$-division logic 39 and the counter 43 through terminals designated by reference numerals 53 and 66, respectively. Thus, in this operation, the timing pulses in train 77 repeat $N_V$ times in the train with a period of $n_{WH}$ during the writing interval $V_{SW}$, and the value of $n_W$ is programmable. This operation corresponds to a selection of the horizontal line (H) signals.

A counter control logic designated by reference numeral 38 produces a train of timing pulses designated by reference numeral 81 in FIG. 6c at a terminal designated by reference numeral 64 of an AND logic designated by reference numeral 41, when the timing interval 79 is applied through the terminal 49, a counted output designated by reference numeral 82 in FIG. 6c supplied from the counter 45 is applied to a terminal designated by reference numeral 50, a horizontal synchronous pulse for the A (main) channel is applied to a terminal designated by reference numeral 49, and the output of the control logic 38 self-consistently resets the AND logic 41 and the counter 45 through terminals designated by reference numerals 58 and 68, respectively. Thus, in the operation, the timing pulses 81 repeat $N_V$ times with a period of H during the reading-out interval $V_{SR}$.

Figure 8A:
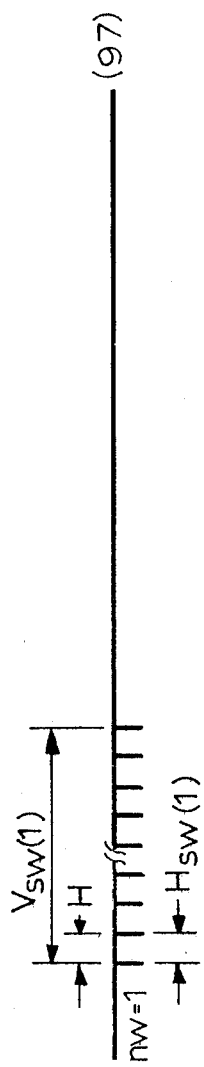
Figure 8B:
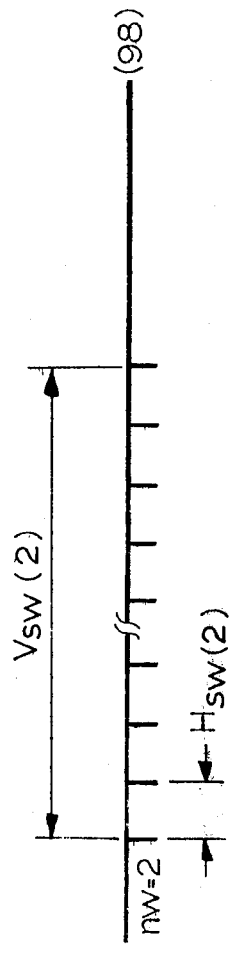
Figure 8C:
Figure 8D:
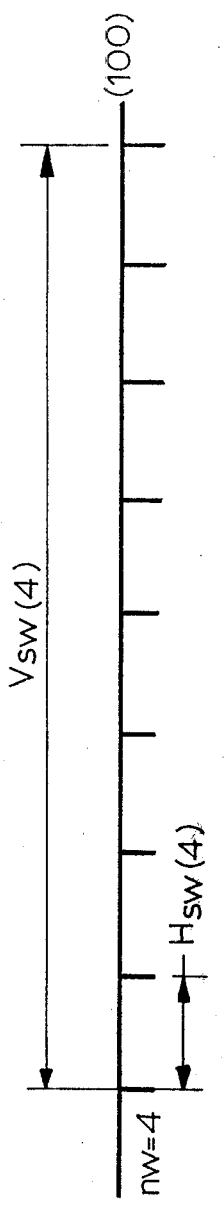
Figure 9A:
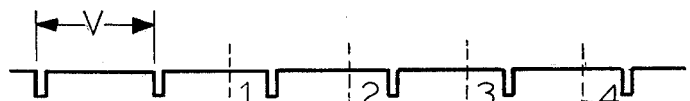
Figure 9B:

A counter control logic designated by reference numeral 40 self-consistently resets the counter 44 through a terminal designated by reference numeral 67 upon receiving a series 78 of the timing pulse 77 at a terminal designated by reference numeral 55, and the timing interval $H_{dW}$ at a terminal designated by reference numeral 54 and a counted output designated by reference numeral 88 in FIG. 8d at a terminal designated by reference numeral 56. As a result of such operations, trains of timing pulses designated by reference numeral 87 in FIG. 7c are produced at an output terminal of counter 44 designated by reference numeral 71. In the above operation, the timing pulses 87 in the train repeat $N_H$ times with a period of the clock frequency $f_{CW}$ during the timing interval $H_{SW}$, and the whole shape of the output timing signal for the writing operation, designated by reference symbol c in FIG. 2, is characterized by a series of trains of clock pulses designated by reference numeral 90 in FIG. 7c with a period of timing pulse trains designated by reference numeral 78 in FIG. 6b. Therefore, it is evident that the series of timing pulse trains 78 operates to select horizontal (H) line signals as inputs of the image information and shift the image information of $N_H$ bits arranged in each line direction in the matrix memory shown in FIG. 3 in the direction along the line by a bit both with a period of $n_WH$, and that the series 90 of timing pulse trains operates to set image information in the selected horizontal (H) line signals into memory cells of $N_H$ bits designated by reference numerals 26, 27 within the interval $H_{SW}$.

A counter control logic designated by reference numeral 42 self-consistently resets the counter 46 through a terminal designated by reference numeral 69 upon receiving a series of the trains of timing pulses 81, designated by reference numeral 83 in FIG. 6c, at a terminal designated by reference numeral 60, and receiving the timing interval $H_{dR}$ at a terminal designated by reference numeral 59 and a counted output designated by reference numeral 95 in FIG. 7f at a terminal designated by reference numeral 61. As a result of such operations, a train of timing pulses designated by reference numeral 94 are produced at an output terminal of counter 46 designated by reference numeral 73. In the above operations, the timing pulses 94 repeat $N_H$ times in the train with for a period of the clock frequency $f_{CR}$ during the timing interval $H_{SR}$, and the whole shape of the output timing for the reading-out operation, designated by reference symbol d in FIG. 2, is characterized by a series of trains of timing pulses designated by reference numeral 97 for a period of the timing designated by reference numeral 83. Therefore, it is evident that the series of timing pulses 83 operates to shift the image information of $N_H$ bits arranged in each line direction in the matrix memory shown in FIG. 3 in the direction along the line by a bit with a period of H, and that the series of 97 of timing pulse trains operates to read-out image information existing in the memory cells of $N_H$ bits designated by reference numerals 28, 29 within the interval $H_{SR}$.

According to the equations (5) and (6), the relation between the size of memory $N_H \cdot N_V$ and selective display ratio R of the writing area $H_{SW} \cdot V_{SW}$ to the reading-out (display) area $H_{SR} \cdot V_{SR}$, is summarized as shown in Table below.

TABLE

| Memory size (M) | Area of B channel picture in combined picture | Area ratio (R) of writing area to displayed area |
|---|---|---|
| 1 | 1 | 1 |
| $(1/2)^2$ | $(1/2)^2$ | $1 \cdot 2^2$ |
| $(1/3)^2$ | $(1/3)^2$ | $1 \cdot 2^2 \cdot 3^2$ |
| $(1/4)^2$ | $(1/4)^2$ | $1 \cdot 2^2 \cdot 3^2 \cdot 4^2$ |
| $(1/5)^2$ | $(1/5)^2$ | $1 \cdot 2^2 \cdot 3^2 \cdot 4^2 \cdot 5^2$ |
| $(1/6)^2$ | $(1/6)^2$ | $1 \cdot 2^2 \cdot 3^2 \cdot 4^2 \cdot 5^2 \cdot 6^2$ |

The symbol M indicates the size of memory required for storing all the picture elements corresponding to one field of TV signal and for displaying the picture elements without much lowering of image resolution.

As an example using the above Table, consider the case when the value of $(\frac{1}{4})^2 M = N_V \cdot N_H$ is chosen for the size of the memory. The the following four operations are possible. [I] When the value $n_W$ is selected to be 1, the display ratio R becomes 1, and a $(\frac{1}{4})^2$ part of a whole picture for the B channel is displayed without compressing the original image size in the B channel in either the vertical direction or horizontal direction. [II] When the value of $n_W$ is selected to be 2, the display ratio R becomes $2^2$, and a $(\frac{1}{2})^2$ part of the whole image is displayed with the original image size being compressed by the factor of 2 in both the vertical direction and horizontal direction. [III] When the value of $n_W$ is selected to be 3, the display ratio R becomes $3^2$, and a $(\frac{3}{4})^2$ part of the whole image is displayed with the original image size being compressed by the factor 3 in both the vertical direction and horizontal direction. Further, [IV] when the value of $n_W$ is selected to be 4, the display ratio R becomes $4^2$, and the whole image for the B channel is displayed with the original image size being compressed by the factor 4 in both the vertical and horizontal directions.

As seen from the four different operations described above, if the last operation is chosen for displaying the whole image in a standard state, the image size displayed in the fixed reading area characterized by $H_{SR} \cdot V_{SR}$ can be partially zoomed to $\frac{3}{4}$, 2 and 4 times by changing the value $n_W$ from 1 to 2, 3 and 4.

Pulses designated by reference numerals 97, 98, 99 and 100 shown in FIGS. 8a–8d correspond to the series of the timing pulse trains 78 having the variable intervals $V_{SW}$ and $H_{SW}$ for the four different writing conditions characterized by the above described operations of $n_W = 1$, 2, 3 and 4. Such different types of series of pulse trains 97–100 are easily produced by changing the division-ratio of the logic 39 in accordance with the information $n_W$ supplied from the terminal 52.

FIGS. 9a–9k show the relations among vertical synchronous signal and writing and reading-out operations when using three CTD memories 101, 102, 103 which construct the memory circuit 19. Image signals existing in the parts $B_1$, $B_2$ and $B_3$ are respectively stored to the memories 101, 102 and 103, and the stored signals are read-out respectively according to the timings corresponding to those in the A channel field. The reference numerals 1, 2, 3, 4, 5, 6, . . . are used to express these correspondences. As three CTD memories are used in this example shown in FIG. 9, for constructing the complete writing timing signal c, three different groups of pulses, which are produced by taking logical AND operations among three phase pulses 107, 108, 109 and the series of timing pulse trains 78 or 90 are required; and for constructing the complete reading-out timing signal d, three different groups of pulses, which are produced by taking logical AND operations among three phase pulses 104, 105, 106 and the series of timing pulse trains 83 or 97, are required. Thus constructed timing signals c and d are amplified to the timing signals e and f which control three CTD memories. The control the pulses k, l, m, shown in FIG. 2, applied to the selection circuit 20 are also produced by taking logical AND operations among the three phase pulses 104, 105, 106 and the reset pulse produced at the terminal 69 which does not have a component of clock frequency $f_{CR}$.

FIG. 10 shows a method of controlling the horizontal timing pulse 86 with the interval $H_{dW}$ and vertical timing pulse 75 with the interval $V_{dW}$, which determine the starting point 5 for writing area, at the terminal 32 of the timing generator 34. According to this example of FIG. 10, the picture area for the B channel is divided into 16 segments in accordance with the case where the size of memories 101, 102, 103 is chosen to be $(\frac{1}{4})^2 M$. Points 115–130 with a pair of pieces of information for the intervals $H_{dW}$ and $V_{dW}$ for each point correspond to the point 5. The pairs of pieces of information are present in the timing generator 34. By controlling these pairs with the aid of remote control signals, the content of the partially zoomed image for the B channel can be changed within the $(\frac{1}{4} \times \frac{1}{4})$ region of total display area for the A (main) channel. It is also possible to control continuously the value of the intervals $H_{dW}$ and $V_{dW}$, by using retriggerable monostable multivibration circuits in the timing generator 34.

Although the values of the intervals $H_{dR}$ and $V_{dR}$ which determine the starting point of the reading-out area are fixed in the above description, the values can be changed by using the same procedure as described in connection with FIG. 10 and controlling the timing generator 36. Although in an example of this invention described above in connection with FIG. 3 and the equations (1) to (4), the size of memory 10 is chosen for fixed values of $N_H$ and $N_V$, and the reading-out (display) area of ($H_{SR} \times V_{SR}$) is also fixed, the area can be changed by changing the size.

What is claimed is:

1. An image display apparatus comprising:
   image signal receiving means for simultaneously receiving a first image signal and a second image signal which are different from each other;
   memory means coupled to said image signal receiving means for writing therein said second image signal into matrixed $N_H \times N_V$ pieces of information;
   write-sampling means coupled to said memory means for converting, with a clock frequency $f_{CW}$, the second image signal in a selected horizontal line interval into $N_H$ pieces of information for storing in said memory means;
   reading-out means coupled to said memory means for reading-out, with a clock frequency $f_{CR}$, the second image signal stored in the memory means by said write-sampling means;
   write-sequence control means coupled to said write-sampling means for repeating the operation conducted by said write-sampling means with a period of $n_W \cdot H$, where H is the horizontal line interval, and $f_{CR} = n_w \cdot f_{CW}$;
   read-out-sequence control means coupled to said reading-out means for repeating the operation conducted by said reading-out means with a period of H;
   display means coupled to said reading-out means for displaying full picture information or partial picture information of said second image signal in a portion of the displayed picture of said first image signal by selecting the integral number $n_W$, the writing clock frequency $f_{CW}$ and the reading-out clock frequency $f_{CR}$, whereby said second image signal is able to be zoomed;
   and display position control means for varying the write start timing of said memory means for displaying a full or partial picture of said second image signal at the portion of the displayed picture of the first image signal.

2. An image display apparatus according to claim 1, wherein said display condition control means comprises means for presetting information for the writing positions of said second image signal corresponding to positions of pictures to be displayed by digitally coding said information for said writing positions, and means for selecting one of the preset writing positions by remote control operation.

3. An image display apparatus according to claim 1, wherein said display condition control means comprises TTL monolithic logic and means for selcting said writing positions and said read-out positions of said second image signals in said memory means by varying CR time constants of said monolithic logics.

4. An image display apparatus according to claim 1, wherein said display condition control means comprises a programmable counter for setting the frequency division ratio, for dividing horizontal synchronous signals to determine for which number of horizontal line periods said second image signal is to be written, and a remote control signal generator and a remote control signal receiver coupled to said programmable counter for supplying a digital signal to said programmable counter to set the desired frequency division ratio.

5. An image display apparatus according to claim 1, wherein said memory means comprises plural charge transfer devices arranged in a two dimensional matrix and functioning to delay analog signals and to store the signals.

\* \* \* \* \*